United States Patent [19]

Browning

[11] Patent Number: 4,577,909

[45] Date of Patent: Mar. 25, 1986

[54] WHEEL COVER CENTER RETENTION SYSTEM

[75] Inventor: James E. Browning, Adel, Ga.

[73] Assignee: International Telephone and Telegraph Corporation, New York, N.Y.

[21] Appl. No.: 463,069

[22] Filed: Feb. 2, 1983

[51] Int. Cl.[4] .............................................. B60B 7/00
[52] U.S. Cl. ........................... 301/37 TP; 301/37 SS
[58] Field of Search .......... 301/37 R, 37 CM, 37 SS, 301/37 C, 37 CD, 37 S, 37 AT, 37 SC, 37 TP, 108 R, 108 S, 108 SC

[56] References Cited

U.S. PATENT DOCUMENTS

| | | | |
|---|---|---|---|
| 2,722,460 | 11/1955 | Dieterich | 301/37 SS |
| 2,885,931 | 5/1959 | McDonald et al. | 301/108 R |
| 2,935,360 | 5/1960 | Lyon | 301/37 SC |
| 2,995,402 | 8/1961 | Lyon | 301/37 AT |
| 3,021,178 | 2/1962 | Thornton | 301/37 AT |
| 3,264,036 | 8/1966 | Wise | 301/37 CM |
| 3,294,452 | 12/1966 | Schmidt et al. | 301/37 SS |
| 3,989,306 | 11/1976 | Buerger | 301/37 CM |
| 4,397,504 | 8/1983 | Connell | 301/37 SS X |
| 4,410,217 | 10/1983 | Loren | 301/37 AT |

Primary Examiner—Robert B. Reeves
Assistant Examiner—Russell D. Stormer
Attorney, Agent, or Firm—James B. Raden; William J. Michals

[57] ABSTRACT

A center retention system for retaining a wheel cover on a vehicle wheel. The system includes a center piece coaxially disposed about the axis of the wheel. A plurality of radially extending straps are provided. The radially outer ends of the straps include hook portions which respectively wrap around the radially inner walls of the air hole slots in the wheel. The other ends of the straps are fastened to the center piece to rigidly locate the center piece along the axis of the wheel. The wheel cover is removably fastened to the center piece by a lock bolt or the like. The torque-tool-engaging surface of the lock bolt is provided in a keyed configuration requiring a unique tool for removal of the lock bolt.

8 Claims, 8 Drawing Figures

WHEEL COVER CENTER RETENTION SYSTEM

BACKGROUND OF THE INVENTION

This invention relates to retention systems for retaining a wheel cover on a vehicle wheel; and, more particularly, to such retention systems which provide center retention and a secure locking device.

Retention systems for retaining a wheel cover on a vehicle wheel are well known and have been widely used in the art. The retention system normally takes the form of a plurality of retention clips spaced along the circumference of a retaining ring the latter of which is further utilized to mount the ornamental wheel cover or disc. Once assembled, the retention clips bittingly engage the radially inner surface of the vehicle wheel to retain the wheel cover on the wheel and to prevent relative rotation therebetween. Locking devices for securing the wheel cover against unauthorized removal from the vehicle wheel are also known and have been used in the art. These locking devices take the form of a bracket which is mounted to one or more of the lug bolts by way of the lug nuts and the bracket provides a means for receiving a threaded fastener extending through the wheel cover and into the bracket.

The present invention provides an improvement over such prior art retention and wheel cover locking systems wherein a center retention system is provided for retaining the wheel cover on the vehicle wheel and which further provides a means for locking the wheel cover to the wheel to prevent the unauthorized removal thereof.

SUMMARY OF THE INVENTION

Briefly, a center retention system for retaining a wheel cover on a vehicle wheel is provided. The vehicle wheel is of the type having a plurality of slots disposed along a radially inward circle of the wheel. A center piece is disposed about the axis of the wheel. A plurality of radially extending straps are provided with each strap having an inner end fastened to the center piece and an outer end for engaging a wall portion of a respective one of the slots. This functions to limit the radially outward movement of the strap. Means are provided for removably fastening the wheel cover to the center piece.

BRIEF DESCRIPTION OF THE DRAWING

The advantages of this invention will become more readily appreciated as the same becomes completely understood by reference to the following detailed description when taken in conjunction with the accompanying drawing wherein:

FIGS. 3a and 3b are top and partial side views, respectively, of the center piece element of the center retention system;

FIG. 4 is a cross-sectional view of the center piece element taken along the lines 4—4 of FIG. 3a; and, FIGS. 5a, 5b and 5c are side bottom and edge views, respectively, of a strap element for use in the system in accordance with the present invention.

DETAILED DESCRIPTION

Figure 1:
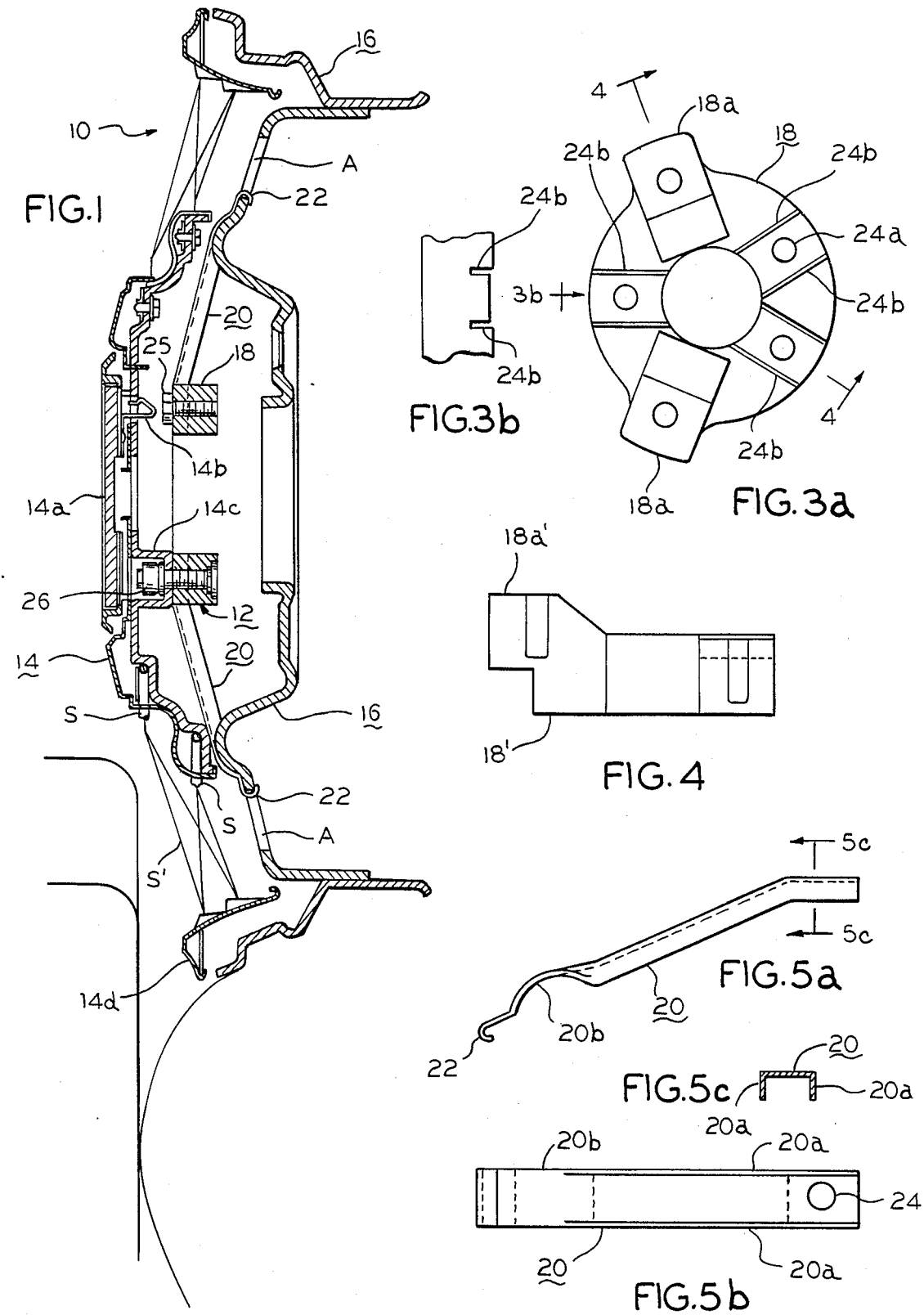
FIG. 1 is a sectional elevational view of the center retention system in accordance with the present invention and is illustrated in conjunction with a vehicle wheel.
Figure 2:
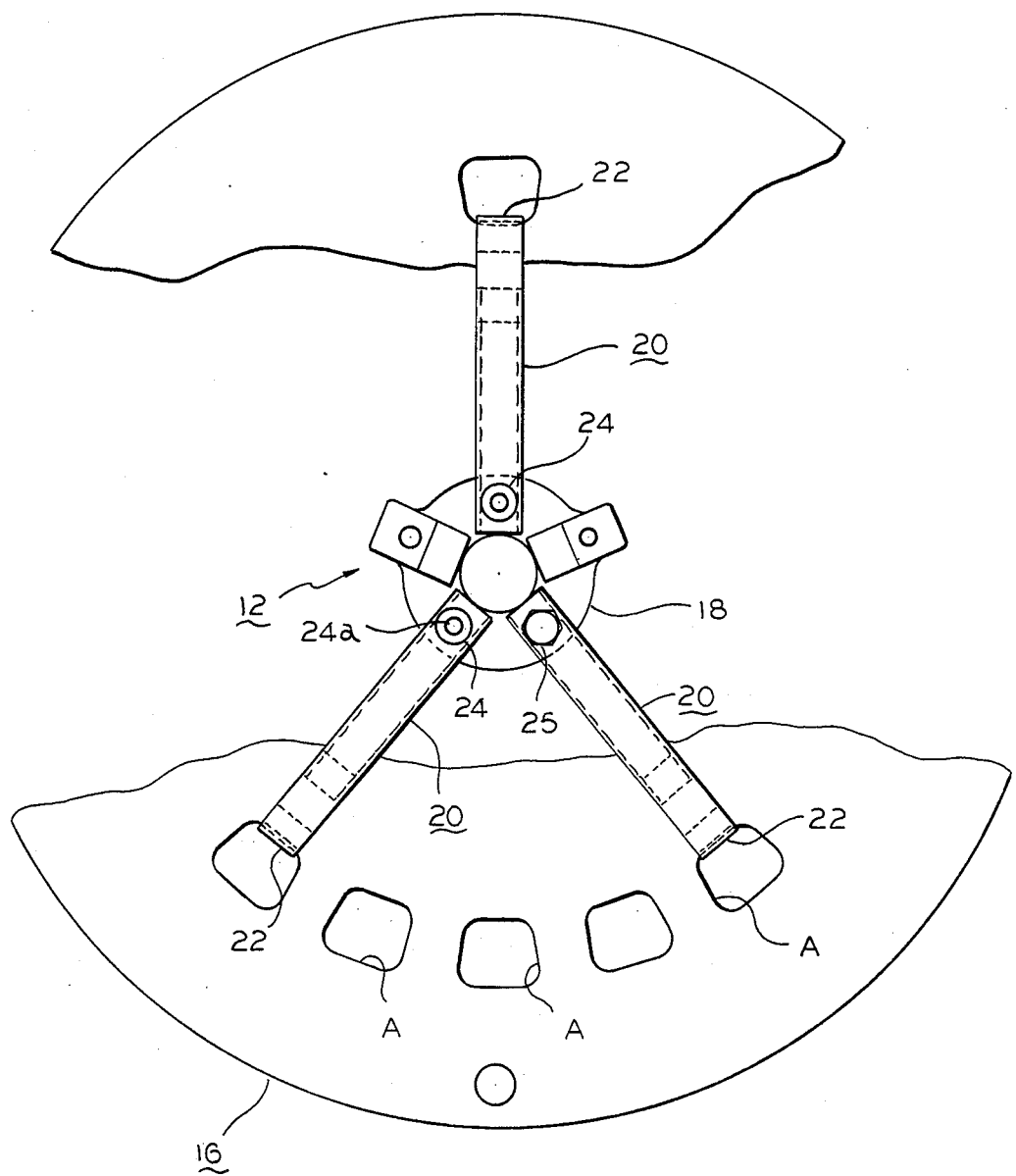
FIG. 2 is a partial plan view of a vehicle shown in conjunction with the center piece and mounting straps of the retention system in accordance with the principles of the present invention.

Referring now to FIG. 1 there is shown a cross-sectional plan view of the center retention system 10 in accordance with the present invention. System 10 includes a center retention and locking device shown generally at 12 and used in conjunction with a wheel cover 14 for mounting wheel cover 14 to a conventional wheel 16. As illustrated in FIGS. 1 and 2 wheel 16 is provided with a plurality of air hole slots A which are disposed along a radially inward circle of the wheel. As described more fully hereinafter, device 12 is mounted to wheel 16 at air holes A thereof by means of a center piece 18 and a plurality of preferably identical straps 20. Each of the straps 20 includes a hook-like end portion at the radially outer end thereof which wraps around the radially inner wall portion of air holes A. The other end of each strap 20 is provided with a mounting hole 24 (as best illustrated in FIG. 5b) which is utilized to mount the strap to center piece 18 as by way of a threaded fastener 24. The wheel cover 14 is provided with a removal medallion 14a which is removably secured to the balance of wheel cover 14 as by way of spring clip 14b. With medallion 14a removed, access is had to a fastener receiving well 14c which is utilized to removably fasten wheel cover 14 to center piece 18 of device 12 as by way of a suitable fastener such as secure lock nut 26 which engages an upstanding bolt mounted to center piece 18. The fastener also may take the form of a bolt which threadly engages a corresponding threaded bore hole, fastener or nut in or otherwise mounted to center piece 18.

It can be seen that straps 20, in conjunction with center piece 18 and fasteners 25, serve to fixedly locate center piece 18 with respect to wheel 16. Thus, the rigidly mounted center piece 18, in conjunction with fasteners 26, functions to mount wheel cover 14 to wheel 16 without the use of the retention clips of the prior art. Further, by means of lock bolt or lock nut 26, retention system 10 can be further utilized to provide a secure locking system for wheel cover 14 to prevent the unauthorized removal thereof. To accomplish this, and in currently preferred practice fastener 26 is provided with a torque-tool-engaging surface disposed on the side of wheel cover 14 which faces away from wheel 16 and which is provided in a keyed configuration for engaging a complementary configuration of the removal tool. This keyed configuration may take the form of a symmetrical star configuration or cavity provided in the head and along the axis of the lock bolt, or any other suitably geometric configuration. Further, in the case of a lock nut, the axially extending circumferential edge may take the form of a undulated pattern which engages the complementary configuration of the tool. It will be appreciated by those skilled in the art that the keyed configuration may take any one of a number of suitable forms.

The wheel cover illustrated in FIG. 1 is of the wire wheel cover type. In wire wheel covers of this type, a plurality of spokes S are provided. The complete spokes are further diagramatically illustrated as S' in FIG. 1. The spokes S serve to complete the assembly of wire wheel cover 14 wherein the outer annular band 14d is secured to the central portion of the wheel cover by the spokes themselves. It can be seen by reference to FIG.

1 that no retention clips are utilized along the outer annular member 14d and that the member is or can be spaced apart from the radially inner surface of wheel 16.

Referring now to FIGS. 3a and 3b there are shown top and partial edge views, respectively, of center piece 18 in accordance with a feature of the present invention. Center piece 18 is provided with two spaced apart lands 18a which are utilized to receive the fasteners which removably fasten wheel cover 14 to center piece 18 in the assembled configuration of center retention system 10. Center piece 18 is further provided with bore holes 24a which serve to receive fasteners 25 when the respective straps 20 are assembled to center piece 18. In this regard, bore holes 24a may take the form of threaded bore holes or can be utilized to receive a self-threading fastener, particularly when center piece 18 is made of plastics material as in currently preferred practice. As best illustrated in FIG. 3b, center piece 18 is provided with a pair of slots 24b at each strap mounting position. As described more fully hereinafter, slots 24b cooperate with corresponding leg portions of the straps to further facilitate the mounting and fastening of straps 20 to center piece 18.

Referring now to FIG. 4 there is shown a cross-sectional view of a modified form of center piece 18 as would be taken along the lines 4—4 of FIG. 3a. Center piece 18' of FIG. 4 is modified to provide raised land portions 18a'. This alternative design can be utilized to directly fasten center piece 18' to the central portion of wheel cover 14 without the use of well portions 14c as illustrated in FIG. 1. In this regard, if well portions, or the equivalent structure, are utilized in the wheel cover 14, the top or outer surface of center piece 18 can be provided in a flat configuration as illustrated in FIG. 1.

Referring now to FIGS. 5a–5c there are shown side, bottom and end views, respectively, of strap 20 in accordance with the present invention. It can be seen that strap 20 is provided of a generally U-shaped cross-sectional configuration (as best illustrated in FIG. 5c) to provide legs 20a which are received in slots 24b of center piece 18. It also can be seen that the hook-end portion of strap 20 can be provided with a contoured configuration 20b which is complementary to a corresponding configuration of wheel 16. The radially outer end 22 of strap 20 may also take a form suitable for engaging a different portion of the air hole slots such as the radially outer wall of air hole slots A. For example, end 22 can be provided with a downwardly directed bend portion followed by a radially outwardly directed bend or tab.

What has been taught, then, is a center retention system for retaining a wheel cover on a vehicle wheel and facilitating, notably, wheel cover retention without the use of bitting-engagement retention clips and further providing a means for securing the wheel cover against unauthorized removal. The forms of the invention illustrated and described herein are but preferred embodiments of these teachings. They are shown as illustrations of the inventive concepts, however, rather than by way of limitation, and it is pointed out the various modifications and alterations may be indulged within the scope of the appended claims.

What is claimed is:

1. A center retention system for retaining a wheel cover on a vehicle wheel of the type having a plurality of slots disposed along a radially inward circle of the wheel, said system comprising:
   a center piece disposed about the axis of said wheel;
   a plurality of radially extending straps, each strap having an inner end fastened to said center piece and an outer end for engaging the radially inward wall of a respective one of said slots thereby to limit the radially inward movement of said strap;
   means for removably fastening said wheel cover to said center piece; and,
   wherein said straps are provided with a generally U-shaped cross section at least along a portion thereof which engages said center piece and wherein the engaging portions of said center piece are provided with corresponding slots for receiving the legs of the U-shaped portions of said straps.

2. The system according to claim 1, wherein said means for removably fastening includes a fastener having a torque-tool-engaging surface disposed on the side of said wheel cover which faces away from said wheel and which is provided in a keyed configuration for engaging a complementary configuration of the tool.

3. The system according to claim 2, wherein said outer ends of said straps are provided with reverse bent, hook-like portions which wrap around the respective radially inner walls of said slots.

4. The system according to claim 1, wherein at least three straps are provided and wherein said means for removably fastening includes at least two fasteners which are respectively received in said center piece at spaced-apart locations.

5. A center retention system for retaining a wheel cover on a vehicle wheel of the type having a plurality of slots disposed along a radially inward circle of the wheel, said system comprising:
   a center piece disposed about the axis of said wheel;
   a plurality of radially extending straps, each strap having an inner end fastened to said center piece and an outer end for engaging a wall portion of a respective one of said slots thereby to limit the radial movement of said strap;
   means for removably fastening said wheel cover to said center piece; and,
   wherein said straps are provided with a generally U-shaped cross section at least along a portion thereof which engages said center piece and wherein the engaging portions of said center piece are provided with corresponding slots for receiving the legs of the U-shaped portions of said straps.

6. The system according to claim 5, wherein said means for removably fastening includes a fastener having a torque-tool-engaging surface disposed on the side of said wheel cover which faces away from said wheel and which is provided in a keyed configuration for engaging complementary configuration of the tool.

7. The system according to claim 6, wherein said outer ends of said straps are provided with reverse bent, hook-like portions which wrap around the respective radially inner walls of said slots.

8. The system according to claim 7, wherein at least three straps are provided and wherein said center piece receives two fasteners.

* * * * *